United States Patent [19]
Williams, Jr.

[11] 3,765,777
[45] Oct. 16, 1973

[54] DEVICE FOR LOCATING AND IDENTIFYING THREADLINE DEFECTS

[75] Inventor: Louis B. Williams, Jr., Pensacola, Fla.

[73] Assignee: Monsanto Company, St. Louis, Mo.

[22] Filed: Feb. 22, 1972

[21] Appl. No.: 227,969

Related U.S. Application Data

[63] Continuation-in-part of Ser. No. 11,173, Feb. 13, 1970, abandoned.

[52] U.S. Cl. .... 356/200, 250/219 DF, 250/219 WE
[51] Int. Cl. ......................................... G01n 21/32
[58] Field of Search ............. 356/200; 250/219 DF, 250/219 WE, 219 S

[56] References Cited
UNITED STATES PATENTS
2,967,947  1/1961  Flook, Jr. ...................... 250/219 S
3,589,816  6/1971  Sugaya .............................. 356/200

Primary Examiner—Ronald L. Wibert
Assistant Examiner—V. P. McGraw
Attorney—Stanley M. Tarter et al.

[57] ABSTRACT

A moving warp sheet is optically monitored by two lights beams in the plane of the sheet, with light-responsive transducers located to receive the beams. The beams cross the sheet along imaginary lines which intersect outside the sheet. The defective threadline is identified by the time interval between actuations of the transducers by a flaw.

10 Claims, 5 Drawing Figures

DEVICE FOR LOCATING AND IDENTIFYING THREADLINE DEFECTS

This is a continuation-in-part of copending application Ser. No. 11,173, filed Feb. 13, 1970, and now abandoned.

The invention relates to identifying defective threadlines in such operations as beaming or warping of tire and textile yarns.

In beaming or warping, a large number of yarns are simultaneously withdrawn from creeled packages, formed into a weftless warp sheet, and wound on a large spool called a beam. Typically an optical defect monitor is positioned to detect flaws or defects such as broken filaments or fluff-balls, and automatically stops the beaming operation. An operator then locates and cuts out the defect, knots the resulting ends, and restarts the beaming operation.

According to the present invention, a method and apparatus are provided for identifying the defective threadline or yarn. The resulting information can be processed or recorded to determine if an abnormal number of defects occur on a particular threadline, thus locating defective bobbins or defective prior processing equipment. Since the defective threadline is identified, it becomes possible to automatically repair the threadline, with resulting increase in efficiency and reduction in labor costs.

A primary object of the invention is to provide methods and apparatus for automatically identifying the defective threadline in a warp sheet.

A further object is to provide methods and apparatus of the above character capable of any desired degree of accuracy in identifying the defective threadline.

Other objects will appear hereinafter, and will in part be obvious from the accompanying drawings, wherein.

Figure 1:
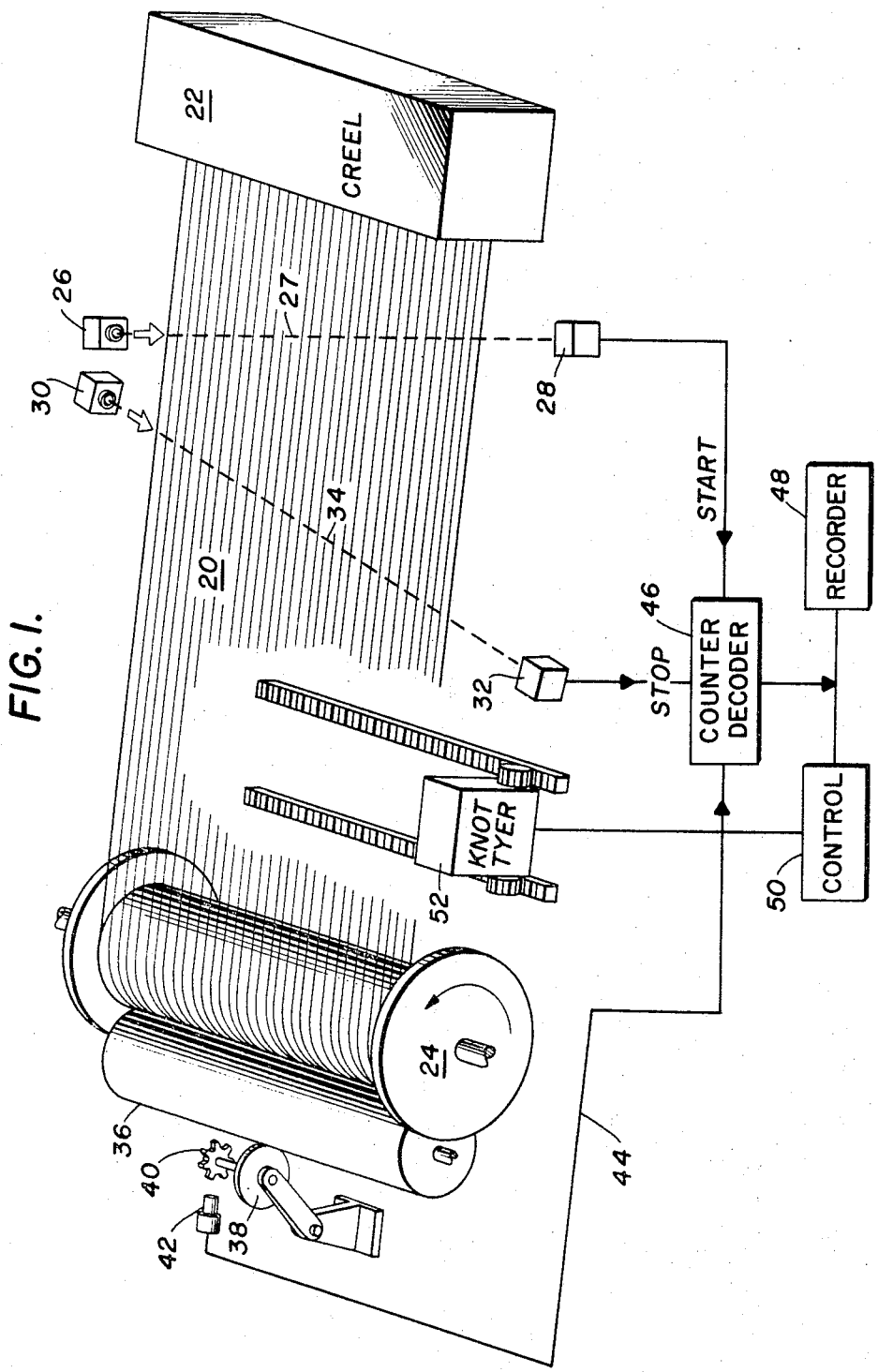
FIG. 1 is a schematic perspective view of a beaming mechanism incorporating the invention.

FIG. 1 shows a weftless warp sheet 20 being fed from creel or other source 22 and wound on beam or spool 24. In a typical commercial operation, warp sheet 20 may have hundreds or even thousands of separate yarns being wound on beam 24. First light source 26 is mounted alongside sheet 20 and directs a beam 27 of light in the plane of sheet 20 to transducer or photocell 28. Source 26 and photocell 28 generate a signal when the shadow of sheet 20 falling on cell 28 varies more than some predetermined amount. The sensitivity of cell 28 is selected so that a signal is produced when a broken filament or fluff ball crosses beam 27. Source 26 and cell 28 as thus described constitutes a conventional flaw detector for a warp sheet, the signal being normally used to stop the beam and signal the operator to repair the defective yarn, as noted above.

According to the preferred embodiment of the invention, a further light source 30 and cooperating transducer of photocell 32 are provided in the plane of and near opposite edges of sheet 20, thus constituting a second flaw detector using light beam 34. The axes of beams 27 and 34 are on imaginary lines which are not parallel and do not intersect within sheet 20. That is, the imaginary lines intersect with the apex of the resulting angle being outside sheet 20.

means are provided for generating a signal proportional to the speed of sheet 20. As is conventional, idler roll 36 rides on the surface of the warp wound on spool 24, and thus rotates at a rate proportional to the rate at which sheet 20 moves. A small wheel 38 rolls on the surface of roll 36, and drives toothed roll or gear 40. Magnetic pickup 42 generates a pulse each time a tooth passes, thus producing on conductor 44 a series of pulses at a rate proportional to the speed of warp sheet 20.

These pulses are counted by counter-decoder 46 under control of transducers 28 and 32. Since beams 27 and 34 are not parallel, the distance a point on each yarn must travel between the light beams will be different from the distance a point on any other yarn must travel. Since all threadlines of the warp sheet travel at the same speed, different time periods will be required for defects on different threadlines to interrupt both beams, with each threadline requiring a unique and characteristic time interval. Generation of a pulse by transducer 28 enables counter-decoder 46 to begin counting the pulses produced by transducer 42, which will continue until a stop pulse is produced by transducer 32. The number of pulses received by counter 46 will thus be characteristic of and will identify the defective threadline. This information can be used directly or can be converted to another form as desired. As illustrated, the pulse count is preferably fed to recorder 48 and to control circuitry 50 for a knot tying mechanism 52. Recorder 48 (which may include a computer) permits identifying threadlines having more than the usual number of defects, thus aiding in identifying problems in prior processes and equipment.

Knot tyer 52 is mounted for lateral movement under warp sheet 22 along stationary rack gears 53. Control circuit 50 drives tyer 52 to a position aligned with the identified defective threadline. Tyer 52 then engages the defective threadline, strips sufficient yarn to insure removal of the defect, and ties a knot in the resulting ends. Control circuit 50 then either restarts the beaming operation or signals an operator to inspect the knot.

Figure 2:
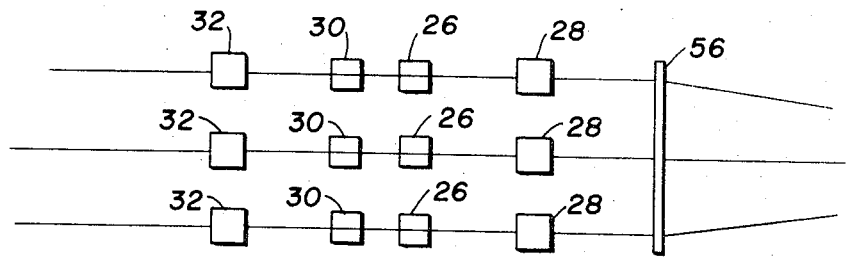
FIG. 2 is a side elevation view of a multi-level warp.
Figure 3:
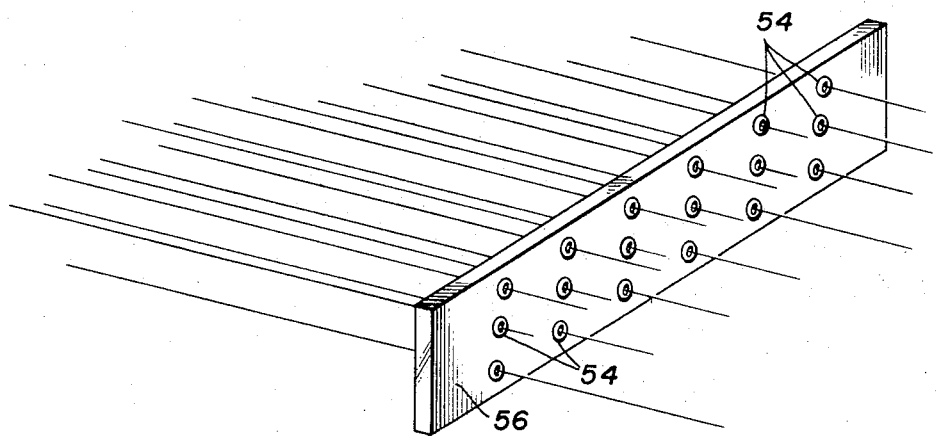
FIG. 3 is a perspective view of a portion of FIG. 2, showing how the several warp levels are provided.

FIGS. 2 and 3 illustrate a method for increasing the resolution of the system without increasing the warp width. This is done by separating the original warp sheet into a plurality of levels, thus increasing the distance between adjacent yarns in the same level. As illustrated in FIG. 3, yarns which would have been adjacent each other in a single level warp sheet are separated by passing through guiding apertures 54 in vertical board 56. The FIG. 3 board 56 forms the yarns into three warp levels, each level being in effect a separate warp wherein the yarns are laterally separated by three times the distance which they would have been separated in the original warp. Other numbers of levels can be used as desired, as can separating means other than the illustrated perforated board. As shown in FIG. 2, each level is supplied with an optical flaw detection system including non-parallel light beams and photocells, similar to the system shown in FIG. 1.

Figure 4:
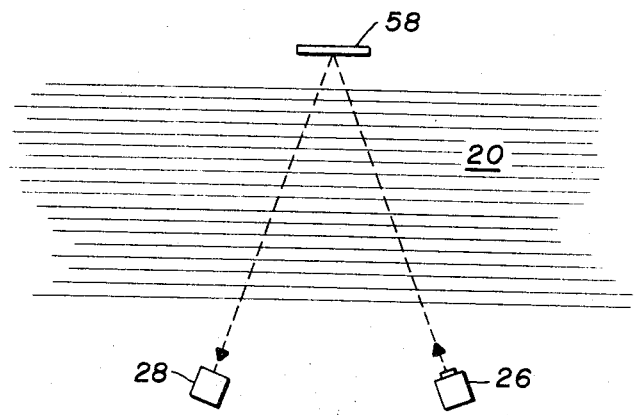
FIG. 4 is a vertical plan view of a simplified modification of the FIG. 1 apparatus.

FIG. 4 illustrates a simplified optical system, wherein a mirror 58 replaces a light source and photocell. Beam 27 from light source 26 crosses warp 20, then is reflected back across warp 20 to photocell 28. When the FIG. 4 optical system is used, counter 46 should be constructed so that a first signal from photocell 28 starts the counter, while a second signal from photocell 28 stops the counter. This may conveniently be done by driving a bistable device (such as a flip-flop) from photocell 28, the alternate output signals from the bistable device supplying the start and stop signals.

Instead of relying solely on an angle between the light beams, the necessary differing distances (which points on the various yarns must travel between the beams) can be provided by guiding the yarns in the space between the beams, through paths of different lengths.

Figure 5:
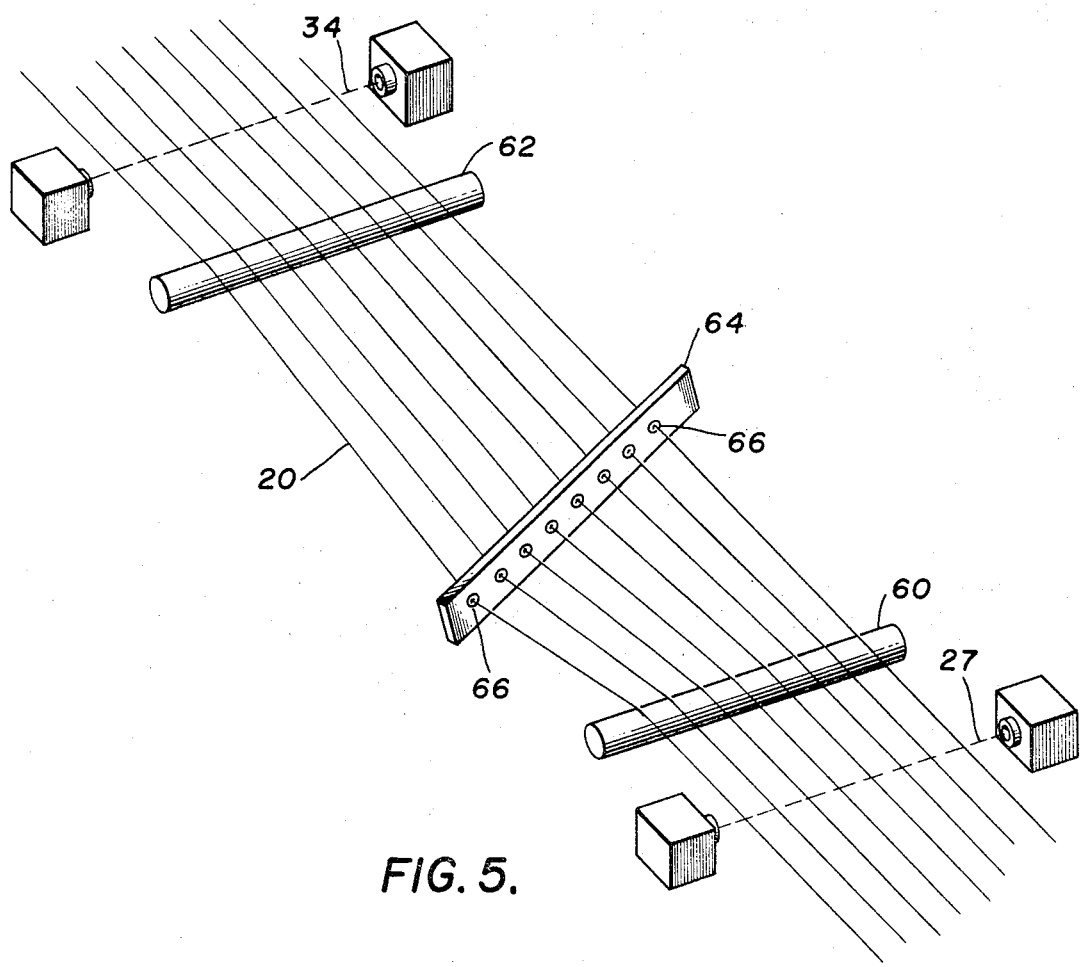
FIG. 5 is a perspective view of a further embodiment of the invention.

FIG. 5 illustrates one simple method for accomplishing this. Between light beams 27 and 34, sheet 20 passes over horizontal guide bars 60 and 62. An intermediate guide board 64 inclines downwardly from its furthest end in the plane of bars 60 and 62 to a lower level at its nearest end, as viewed in FIG. 5, and extends generally laterally with respect to the path of sheet 20. A guide aperture 66 is provided in board 64 for each yarn of sheet 20, the apertures 66 lying along the axis of board 64. Since the axis of board 64 is skewed with respect to the axes of rods 60 and 62, a point on the yarn nearest the viewer in FIG. 5 must travel a greater distance between the light beams than does a point on the yarn at the opposite edge of sheet 20. Points on the intermediate yarns must travel corresponding intermediate values, depending on how far their associated apertures 66 are below the plane defined by bars 60 and 62. While beams 27 and 34 are illustrated as parallel in FIG. 5, it should be understood that they could be arranged at an angle similar to the FIG. 1 embodiment to further increase the resolution of the system.

While the invention has been disclosed as identifying the particular threadline which has a defect, there are applications wherein such precision is not necessary. An example is in warping of textile denier yarns wherein large numbers of yarns are present, closely spaced in the warp sheet. In such a case, considerable savings in time can be achieved if the apparatus merely indicates to the operator the general area of the warp sheet in which the defect occurs. The operator can then visually locate the defect within the indicated area much more rapidly than if it were necessary to visually inspect the entire warp sheet. Accordingly, the invention has substantial utility even if the number of pulses received by counter decoder 46 does not precisely correspond to the position of the defective threadline.

What is claimed is:

1. Apparatus for identifying a defective yarn in a moving warp sheet, comprising:
   a. first detection means for producing a first signal when a yarn defect passes a first line crossing said warp sheet;
   b. second detection means for producing a second signal when a yarn defect passes a second line crossing said warp sheet, said first and said second detection means being oriented such that said first line and said second line are in the plane of said warp sheet and form an angle having an apex outside said warp sheet; and
   c. threadline identification means responding to occurrence of said first and said second signals for indicating the area of said warp sheet having a defect.

2. The apparatus defined in claim 1, wherein said identification means includes:
   a. means generating pulses proportional to the linear speed of said warp sheet; and
   b. means for counting the number of pulses generated between the occurrence of said first and said second signals.

3. The apparatus defined in claim 1, wherein at least one of said detection means comprises:
   a. a light source projecting a beam of light in the plane of said warp sheet and along said line; and
   b. photo-responsive means positioned to receive said beam of light.

4. The apparatus defined in claim 1, wherein said identification means comprises means for identifying the yarn having a defect.

5. Apparatus for identifying a defective yarn in a moving warp sheet, comprising:
   a. a light source positioned at one side of said sheet;
   b. a light detector positioned at said one side of said sheet;
   c. a mirror positioned at the opposite side of said sheet; and
   d. the positions of said source, said detector and said mirror being selected so that a beam of light from said source passes in the plane of said sheet to said mirror and is then reflected at an angle in the plane of said sheet to said detector.

6. Apparatus for identifying a defective yarn in a moving multilevel warp sheet, comprising:
   a. a first detection means at each level for producing a first signal when a yarn defect passes a first line crossing the respective level;
   b. a second detection means at each level for producing a second signal when a yarn defect passes a second line crossing the respective level, said first and second lines in each level forming an angle in each said level, each said angle having an apex outside said respective level; and
   c. threadline identification means responding to occurrence of said first and said second signals for identifying the area of said warp sheet having a defect.

7. The apparatus defined in claim 6, wherein said identification means comprises means for identifying the yarn having a defect.

8. A method for identifying a defective yarn in a moving warp sheet, comprising the steps of:
   a. guiding the several yarns constituting said warp sheet so that each yarn travels a different distance in traveling between a first line and a second line crossing said warp sheet than does any other yarn;
   b. producing a first signal when a yarn defect passes said first line;
   c. producing a second signal when a yarn defect passes said second line; and
   d. responding to occurrence of said first and said second signals for identifying the area of said warp sheet having a defect.

9. The method defined in claim 8, wherein said step of responding comprises identifying the yarn having a defect.

10. A process for identifying a defective yarn in a moving planar warp sheet, comprising:
    a. producing a first signal when a yarn defect passes a first line crossing said warp sheet;
    b. producing a second signal when a yarn defect passes a second line crossing said warp sheet, said first and said second lines being oriented in the plane of said warp sheet to form an angle having an apex outside said warp sheet; and
    c. responding to occurrence of said first and said second signals for identifying the yarn having a defect.

* * * * *